United States Patent
Jin

(10) Patent No.: US 8,326,953 B2
(45) Date of Patent: Dec. 4, 2012

(54) CONFIGURATION MANAGEMENT METHOD AND SYSTEM FOR CUSTOMER PREMISES EQUIPMENT

(75) Inventor: Hui Jin, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1494 days.

(21) Appl. No.: 11/596,613

(22) PCT Filed: Apr. 27, 2006

(86) PCT No.: PCT/CN2006/000823
§ 371 (c)(1),
(2), (4) Date: Nov. 15, 2006

(87) PCT Pub. No.: WO2006/116922
PCT Pub. Date: Nov. 9, 2006

(65) Prior Publication Data
US 2008/0010358 A1 Jan. 10, 2008

(30) Foreign Application Priority Data
Apr. 30, 2005 (CN) .......................... 2005 1 0071505

(51) Int. Cl.
*G06F 15/177* (2006.01)
*G06F 15/16* (2006.01)

(52) U.S. Cl. ....................................... 709/220; 709/206

(58) Field of Classification Search .................. 709/206, 709/220
See application file for complete search history.

(56) References Cited

U.S. PATENT DOCUMENTS

| 6,847,704 B1 | 1/2005 | Cherchali et al. .......... 379/93.05 |
| 7,657,612 B2 * | 2/2010 | Manchester et al. .......... 709/220 |

(Continued)

FOREIGN PATENT DOCUMENTS

CN 1471008 A 1/2004

(Continued)

OTHER PUBLICATIONS

Dslhome-Technical Working Group, DSL Forum: "CPE WAN Management Protocol TR-069" Technical Report, [Online] May 2004, pp. 1-109, Retrieved from the Internet: <URL:broadband-forum.org/technical/download/TR-069.pdf> [retrieved on Aug. 6, 2009].*

(Continued)

*Primary Examiner* — Asad Nawaz
*Assistant Examiner* — Nicholas Jensen
(74) *Attorney, Agent, or Firm* — Conley Rose, P.C.; Grant Rodolph

(57) ABSTRACT

The present invention relates to a technology for terminal equipment configuration management of a communication system, and embodiments of the present invention disclose a configuration management method and system for a customer premises equipment, which enable simpler interaction between a CS and CPEs in the case of batch configuration management on the CPEs. In the embodiments, a uniform file interaction interface is used, and a file server is provided as an intermediate for the interaction of configuration files; a uniform XML-based configuration template is used to embody therein configuration items common to the same type of CPEs, and personalized data of each CPE is further incorporated to generate a personalized configuration file for the CPE. Respective elements of the configuration file are also specified comprehensively. Furthermore, two methods for validation of the configuration are proposed respectively based upon the TR069 and the SNMP.

7 Claims, 6 Drawing Sheets

U.S. PATENT DOCUMENTS

| | | | |
|---|---|---|---|
| 2002/0161861 A1* | 10/2002 | Greuel | 709/220 |
| 2002/0194289 A1 | 12/2002 | Engel et al. | |
| 2003/0135596 A1 | 7/2003 | Moyer et al. | 709/223 |
| 2003/0200285 A1* | 10/2003 | Hansen et al. | 709/220 |
| 2004/0002943 A1* | 1/2004 | Merrill et al. | 707/1 |
| 2004/0055015 A1 | 3/2004 | Lesenne et al. | |

FOREIGN PATENT DOCUMENTS

| | | |
|---|---|---|
| CN | 1471788 A | 1/2004 |
| CN | 1556620 A | 12/2004 |
| EP | 1 343 271 A1 | 9/2003 |
| EP | 1376930 | 1/2004 |
| EP | 1432197 A1 | 6/2004 |
| WO | 2004/091173 A1 | 10/2004 |

OTHER PUBLICATIONS

International Search Report issued for PCT/CN2006/000823, dated Aug. 17, 2006.

First European Office Actiion dated Jul. 25, 2008; Appln. 06 741 744.4-2416.

English Translation of the Written Opinion of the International Searching Authority; Appln. PCT/CN2006/000823.

DSLHOME Technical Working Group; "DSL Forum Working Text WT-121 Revision 11 TR-069 Implementation Guidelines", Nov. 2006, 242 pages.

Broadband Forum Technical Report; "TR-069 Amendment 3 CPE WAN Management Protocol,", Issue: 1 Issus Date: Nov. 2010, Protocol Version: 1.2, 197 pages.

* cited by examiner

CONFIGURATION MANAGEMENT METHOD AND SYSTEM FOR CUSTOMER PREMISES EQUIPMENT

FIELD OF THE INVENTION

The present invention relates to the field of communication technology, and particularly to a configuration management method and system for a customer premises equipment.

BACKGROUND OF THE INVENTION

As wideband networks advance rapidly, deployments and services of the wideband networks of major telecommunication operators gradually come to saturation. The telecommunication operators can not be satisfied with profits purely on network access services, and turn to seek developments of various value-added services. Terminal equipments, which are carriers of those value-added services, become the last one-meter edge extension of telecommunication networks and the spot coming to the attention of the operators. Meanwhile, since the terminal equipments are characteristic of a huge number, a broad geographic distribution, and difficulty in an initiative access due to being located on the user side, the distribution of services related to the terminal equipments and how to reduce the costs of maintenance and management become a challenge and a focus.

Currently, major standardization organizations in the industry are paying their attention to solutions with respect to maintenance and management of the terminal equipments. For example, the Digital Subscriber Line (DSL) Forum established a series of specifications for various xDSL terminal equipments, the Institute of Electrical and Electronics Engineers (IEEE) established a series of specifications for WiMAX, etc.

As proposed in the TR069 specification by the DSL Forum, a passive management model was adopted in which an initiative request is initiated by a terminal equipment, and specifically, a Remote Procedure Call (RPC) is used to read and write configuration parameters related to a batch of Customer Premises Equipments (CPEs) for management on the terminal equipments. Here, the CPE is a terminal equipment on the user side.

As proposed in the TR069, Each CPE is provided with a set of parameters descriptive of its configuration, and a Configuration Server (CS) performs the configuration by reading and writing the parameters of the terminal equipment through the RPC, as shown in FIG. 1. However, this may have the following disadvantages.

Differences in type and version of CPEs may result in different configuration parameters, and there may be different configuration or interaction methods even in the case of identical parameters. Therefore, for different types and versions of CPEs, the CS needs to comprehend and appropriately configure the configuration parameters supported by them, which may result in great difficulty and high cost in implementing the system.

Since different CPEs relate to different end users, the CS needs to perform the CPE configuration managements for the different end users, and hence can not achieve a batch management and configuration, which can not be adapted to a context where the CPE is applied in practice.

SUMMARY OF THE INVENTION

Embodiments of the present invention provide a configuration management method and system for a customer premises equipment which enable simpler interaction between a CS and CPEs in the case of batch configuration management on the CPEs.

An embodiment of the present invention provides a configuration management method for a customer premises equipment, including the steps of:

A. a configuration server sending to the customer premises equipment a request message for download or upload of a configuration file, wherein the request message includes parameters necessary for the download or upload of the configuration file;

B. the customer premises equipment responding to the request message by, according to the parameters therein, downloading a previously-generated configuration file from or uploading a local configuration file to a file server; and C. upon completion of the download or upload, the customer premises equipment sending to the configuration server a response message including the result of the download or upload.

Optionally in the case of the download of the configuration file by the customer premises equipment, the step A may further include the steps of:

before sending the request message, the configuration server generating the configuration file for the customer premises equipment according to a configuration template, and storing the configuration file in the configuration server or the file server, wherein the configuration template stores an attribute common to the same type of customer premises equipments.

Optionally in the case of the download of the configuration file by the customer premises equipment, the step C may further include the steps of:

after downloading the configuration file, the customer premises equipment performing parameter configuration according to a content of the configuration file, and reporting the configuration result to the configuration server.

Optionally in the step C, after downloading the configuration file and before performing parameter configuration by the customer premises equipment, the method may further include the steps of:

checking the configuration file, and if the check succeeds, then performing parameter configuration, otherwise setting, in the response message, information indicative of the failure of the check on the configuration file.

Optionally the configuration file may be compliant to the specification of extensible markup language, and may include version information on the configuration file.

Optionally the configuration file may have a unique name and correspond to a customer premises equipment; and/or the configuration file may be stored in a different directory on the file server, according to the type thereof; and/or each configuration element in the configuration file may include an operation type attribute indicative of the type of an operation performed on the configuration element; and/or each table object in the configuration file may have an attribute indicative of the number of line instances in the table.

Optionally the operation type may include modification, addition or deletion.

Optionally the parameters necessary for the download or upload may include:

an address of the file server, a protocol type for the download or upload, an account number and a password for the download or upload, a path destined for the configuration file and a name of the configuration file.

Optionally the method may be implemented based upon the TR069 specification wherein:

the configuration server invokes a corresponding function to inform the customer premises equipment of downloading the configuration file, and issues command information identifying the current operation;

the customer premises equipment responds to the configuration server;

Optionally the step C may include the steps of:

C11. at the end of the download, the customer premises equipment invoking a corresponding function to inform the configuration server, wherein the function includes the command information and an error code indicative of whether the download succeeds or not;

C12. when the downloaded file is checked with success and validated, the customer premises equipment invoking a corresponding function to report to the configuration server the final configuration information including the command information and the version number of the current configuration file.

Optionally the method may further include the step of:

in the case that the connection between the customer premises equipment and the configuration server is broken, the customer premises equipment invoking a corresponding function to reestablish the connection, wherein the function includes the command information and the version number of the current configuration file.

Optionally in the case that the customer premises equipment needs a restart for validation of new configuration, the customer premises equipment may be restarted after the step C11.

Optionally the method may be implemented based upon the Simple Network Management Protocol wherein:

in the step A, the configuration server setting an MIB table to inform the customer premises equipment of downloading the configuration file;

in the step B, upon start of the download or upload of the configuration file, the customer premises equipment informing the configuration server with a corresponding message; and the step C may further include the steps of:

C21. at the end of the download, the customer premises equipment informing the configuration server with a corresponding message; and C22. if the download succeeds, then the customer premises equipment reporting, with a corresponding TRAP message, to the configuration server the final configuration information including the version number of the current configuration file.

Optionally in the case that the customer premises equipment needs a restart for validation of new configuration, the customer premises equipment may be restarted after the step C21.

The configuration server may be adapted to send to the customer premises equipment a request message for download or upload of a configuration file, wherein the request message includes parameters necessary for the download or upload of the configuration file;

the customer premises equipment may be adapted to respond to the request message by, according to the parameters therein, downloading a previously-generated configuration file from or uploading a local configuration file to a file server, and upon completion of the download or upload, to send to the configuration server a response message including the result of the download or upload.

Optionally the system may further include a file server for storing configuration files, and wherein the customer premises equipment may be adapted to respond to the request message by, according to the parameters therein, downloading a previously-generated configuration file from or uploading a local configuration file to the file server.

Optionally in the case of the download of the configuration file by the customer premises equipment:

before sending the request message, the configuration server generates the configuration file for the customer premises equipment with incorporation of personalized data of the customer premises equipment according to a configuration template, and storing the configuration file in the configuration server or the file server, wherein the configuration template stores an attribute common to the same type of customer premises equipments; and at the end of the download of the configuration file, the customer premises equipment performs parameter configuration according to a content of the configuration file, and reporting the configuration result to the configuration server.

Another configuration management method for a customer premises equipment according to an embodiment of the present invention stores a previously generated or modified configuration file in a configuration server, and includes the steps of:

the configuration server sending to the customer premises equipment a request message for download or upload of a configuration file, wherein the request message includes parameters necessary for the download or upload of the configuration file;

the customer premises equipment responding to the request message by, according to the parameters therein, downloading a previously-generated configuration file from or uploading a local configuration file to the configuration server; and upon completion of the download or upload, the customer premises equipment sending to the configuration server a response message including the result of the download or upload.

As can be seen in comparison, according to the solutions of the embodiments of the present invention, a uniform file interaction interface is used, and the file server is provided as an intermediate for the interaction of configuration files; a uniform extensible Markup Language (XML)-based configuration template is used to embody therein configuration items common to the same type of CPEs, and the personalized data of each CPE is further incorporated to generate a personalized configuration file for the CPE. Respective elements of the configuration file are also specified comprehensively. Furthermore, two methods for validation of the configuration are proposed respectively based upon the TR069 and the Simple Network Management Protocol (SNMP).

In the embodiments of the present invention, with the use of the uniform file interaction interface, the interaction between the CS and the CPS may be simpler as compared with the interaction by way of the RPC method in the prior art, and hence, it is possible to provide management on a huge number of terminal equipments. Additionally, the file interaction interface can be adapted flexibly, and changes will occur merely to the contents of the configuration file but not to those interaction-involved modules in the CS and the CPE, regardless of whatever upgrade of the CE and the CPE as well as addition, deletion and change of CPE parameters.

With the use of the uniform configuration template, the configuration files can be generated in batch according to the template, and the use of one configuration template can be enough for modification of one type of, possibly thousands of, configuration parameters, which is suitable for management on a huge number of terminal equipments.

Since the XML is used for the configuration template, and the XML has a strong ability in expression, therefore it is possible to be adapted to requirements from various application contexts, and to provide a good basis for future upgrade of the system. Moreover, the XML is a standardized language, and hence is convenient for intercommunication between equipments from different manufacturers.

With the two methods for validation of the configuration based upon the TR069 and the SNMP, the solutions of the embodiments of the present invention can be applicable no matter whether validation of the CPE configuration requires a restart or not.

DETAILED DESCRIPTIONS OF THE EMBODIMENTS

Embodiments of the present invention will be further described in detail in connection with the drawings.

Figure 1:
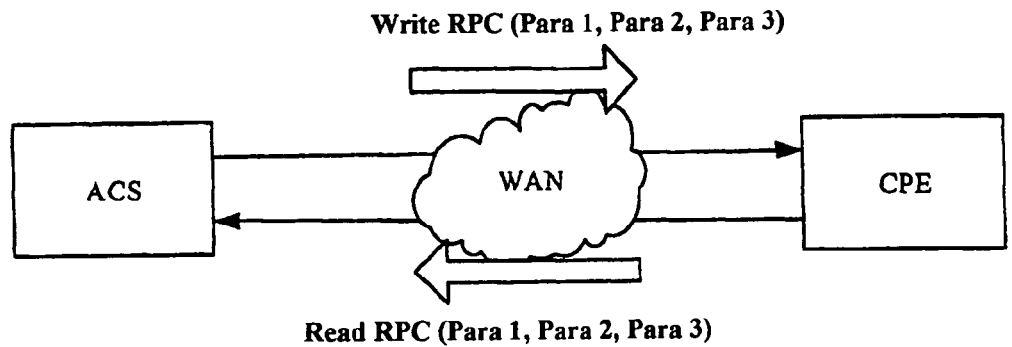
FIG. 1 is a diagram illustrating a basic principle for performing configuration management on a CPE by a CS in the prior art.
Figure 2:
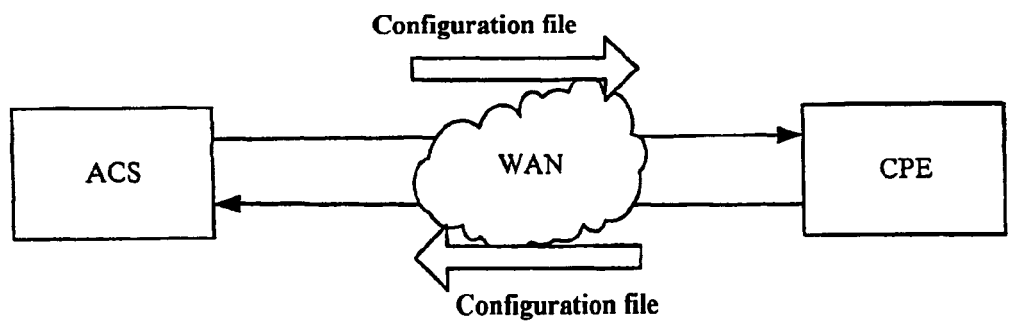
FIG. 2 is a diagram illustrating a basic principle for performing configuration management on a CPE by a CS according to an embodiment of the present invention.

As shown in FIG. 2, a CS and a CPE communicate through a uniform interface for transmission of configuration files, and either modification of or reading of one or more parameters of the CPE can be done through download or upload of a configuration file corresponding to the CPE. The CS informs the CPE of those parameters in need of attention by setting a corresponding addition, deletion or modification flag in the configuration file. In this way, regardless of the type or version of the terminal equipment, the interface between the CS and the CPE accommodates a uniform interface and flow for delivery of configuration files, and differences in specific services can be identified from such contents of the files, which can be determined with configuration of a file template.

An embodiment of the present invention also provides a system, including a CS, a CPE(s), and a file server, wherein the file server is newly added in the embodiment for storing configuration files.

The basic functions of the CS and the CPE are identical to those in the prior art, and only the way of configuration management of CPE parameters is improved according to the embodiments of the present invention, particularly as following.

A new main function of the CS is to use the file template to generate a configuration file and inform the CPE of a method for download or upload of the configuration file.

Another new main function of the CPE is to download or upload a configuration file, check the downloaded configuration file, modify local parameter configuration based upon contents in the configuration file checked with success and report a final result to the CS.

Two embodiments of the present invention are provided respectively based upon the TR069 specification and the SNMP protocol, in conjunction with the above system. With respect to each embodiment, four flows (setting of CPE parameters, reading of CPE parameters, configuration validation notification without a restart and configuration validation notification after a restart) will be firstly described, and then, data interface models for supporting these flows will be described. The two embodiments share the same configuration template which will be described finally.

Figure 3:
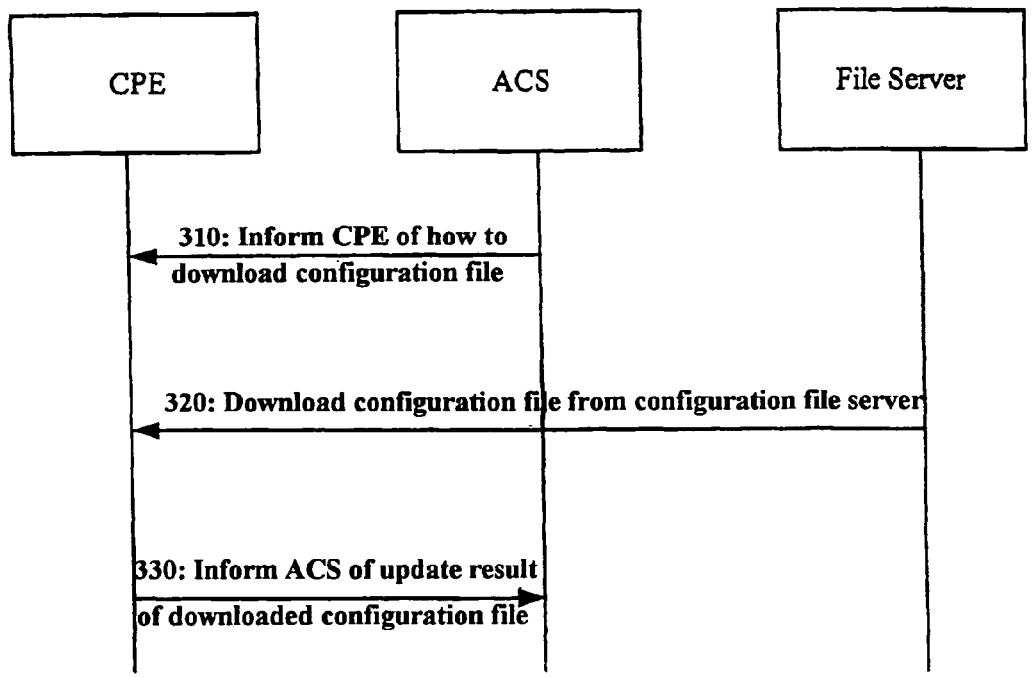
FIG. 3 is a flow chart for setting CPE parameter according to a first embodiment of the present invention.

The first embodiment of the present invention is based upon the TR069 specification, and a flow for setting CPE parameters will be explained below with reference to FIG. 3. When the CS needs to configure the parameters on the CPE, firstly the CS locally performs modification of a configuration file corresponding to the CPE, and stores the modified configuration file to the file server. Then in step 310, the CPE is set through RPC, notified of downloading the configuration file from the file server, and informed of relevant parameter necessary for the download of the configuration file, such as the address of the server, a protocol type for the download (FTP or HTTP, and in the case of FTP, an account number and a password are further needed to be provided), a path destined for the file, the name of the file, etc.

Next, the flow proceeds to step 320, wherein the CPE downloads the configuration file from the file server.

Next, the flow proceeds to step 330, wherein the CPE checks the downloaded configuration file, and upon success of the check, updates the parameters in accordance with the modification flag in the configuration file. The CPE, upon completion of the update, informs the CS of the update result through RPC. The check is for the purpose of ensuring correctness of the configuration file. There are existing mature methods for checking files, which will be not detailed here.

Figure 4:
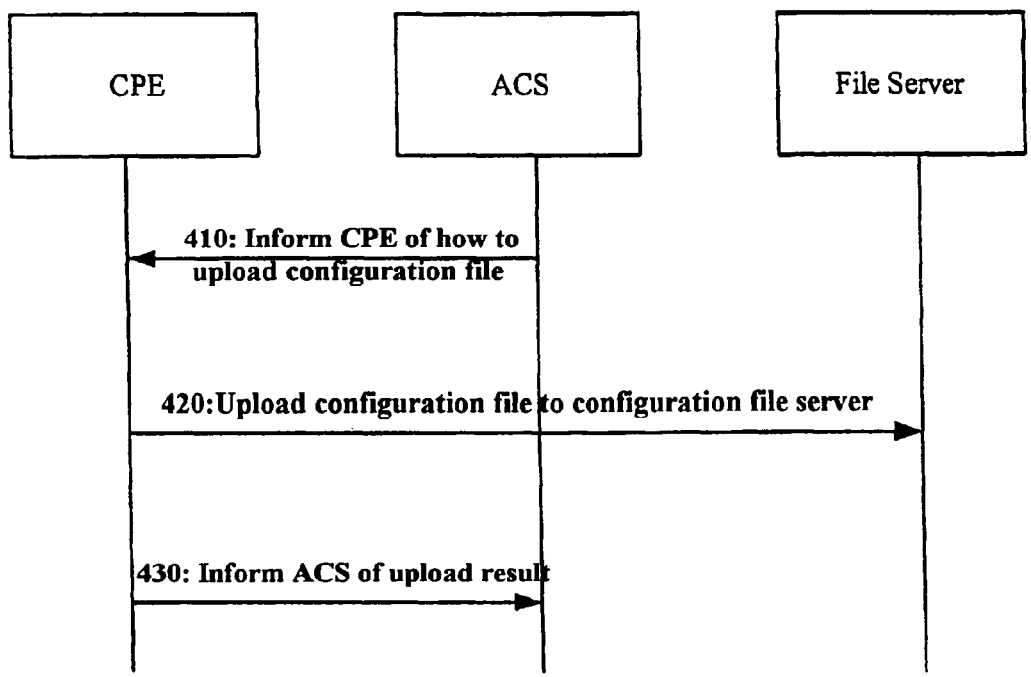
FIG. 4 is a flow chart for reading CPE parameter according to the first embodiment of the present invention.

Referring to FIG. 4, a flow for reading CPE parameters will be described below. When the CS needs to read the CPE parameters, the CPE is set through RPC, notified of uploading the current configuration file to the file server, and informed of relevant parameter necessary for the upload of the configuration file, such as the address of the server, a protocol type for the upload (FTP or HTTP, and in the case of FTP, an account number and a password are further needed to be provided), a path destined for the file, the name of the file, etc., in step 410.

Next, the flow proceeds to step 420, wherein the CPE uploads the current configuration file to the file server.

Next, the flow proceeds to step 430, wherein the CPE informs the CS of the upload result through PRC upon completion of the upload.

Figure 5:
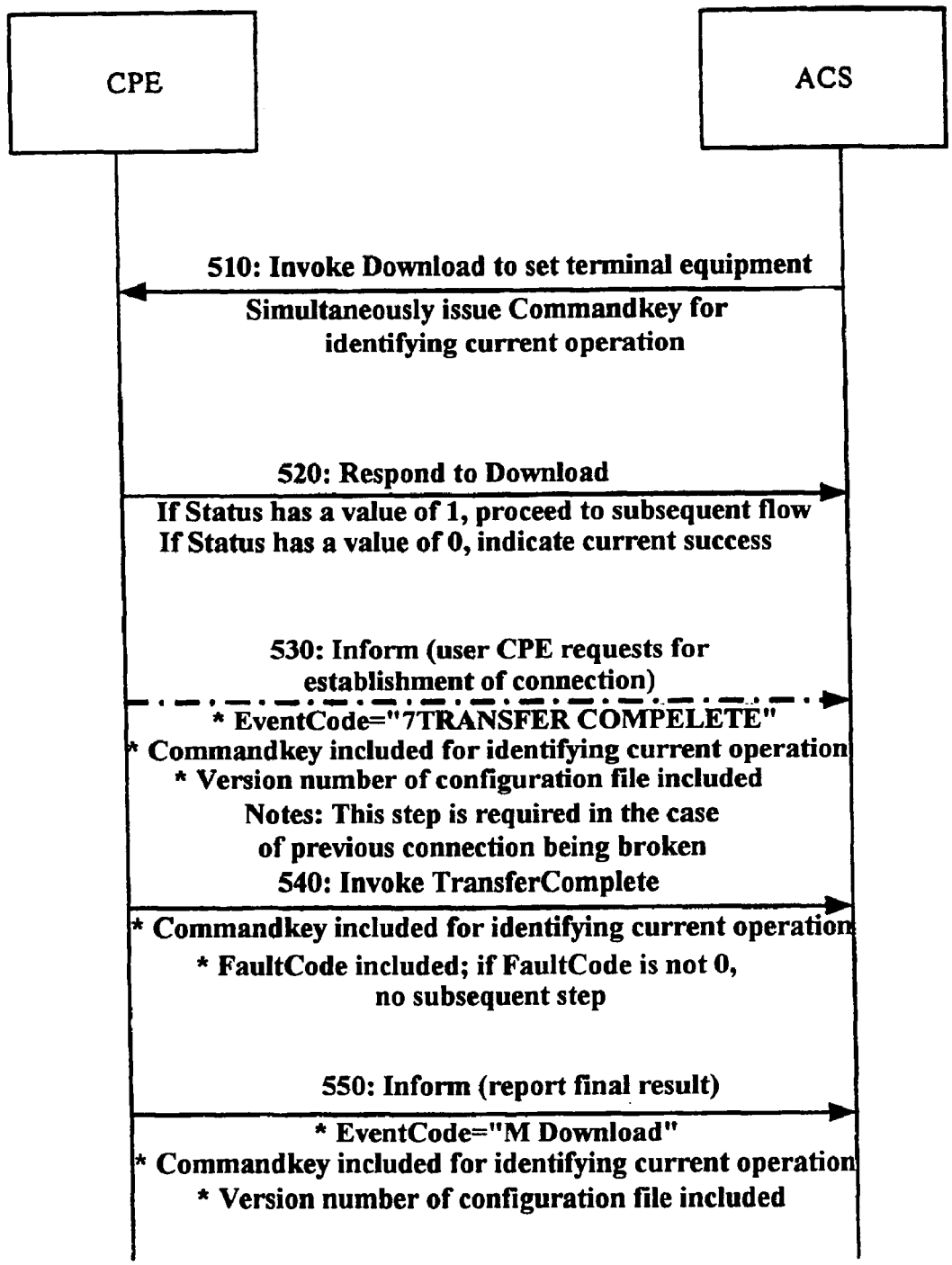
FIG. 5 is a flow chart for CPE configuration validation notification without a CPE restart according to the first embodiment of the present invention.

Referring to FIG. 5, a flow for CPE configuration validation notification will be described below, which is suitable for the case that no restart is required for configuration validation in the CPE.

In step 510, the CS invokes the Download method to set the terminal equipment, notifies the CPE of downloading the configuration file from the file server, and informs relevant parameters of how to download the configuration file, and also issues the CommandKey (command ID) identifying the current operation. As is well known to those skilled in the art, thanks to the CommandKey, it is possible to perform a plurality of commands in parallel, and if the CS sends a plurality of commands to the CS, then the CS, upon reception of a response message, judges from the CommandKey carried therein which of the commands the message responds to.

Then in step 520, the CPE sends to the CS a response to the Download method during the download from the file server, and this response, as defined in the TR609, carries a Status parameter, wherein the value of 1 indicates that the file has not been downloaded completely or the configuration has not been validated, and the value of 0 indicates a current success.

During the download, if the connection between the CPE and the CS is broken accidentally, then the flow proceeds to step 530, wherein the CPE requests for reestablishment of the connection through the Inform function. Here, the parameter of EventCode is "7 TRANSFER COMPLETE", the CommandKey for identifying the current operation (identical to the CommandKey issued along with the Download in step 510), and the version number of the configuration file are also carried.

At the end of the download of the configuration file, the flow proceeds to step 540, wherein the CPE invokes the "TransferComplete" method to inform the CS of the end of the download of the configuration file. Here, the CommandKey for identifying the current operation (identical to the CommandKey issued along with the Download in step 510), and the parameter of FaultCode are carried. The FaultCode is an error code for the current download, and if the current download succeeds, then the FaultCode is 0 and the flow proceeds to step 550, otherwise the FaultCode is an integer representing a cause of the failed download.

In step 550, the successfully downloaded configuration file is checked, and after a check with success, the parameters are updated in accordance with the modification flag in the configuration file. After the updated parameters are validated, the Inform method is invoked to inform the CS of the update result, wherein the parameters of the Inform include the CommandKey for identifying the current operation (identical to the CommandKey issued along with the Download in step 510), the version number of the configuration file, and a parameter of EventCode with a value of "M Download". The reason for upload of the version number is that it is used for determination as to whether a load of the configuration succeeds according to the embodiment, and if this version number is inconsistent with that expected by the administrator side, then it is indicative of failure of the load, otherwise it is indicative of success of the load.

Figure 6:
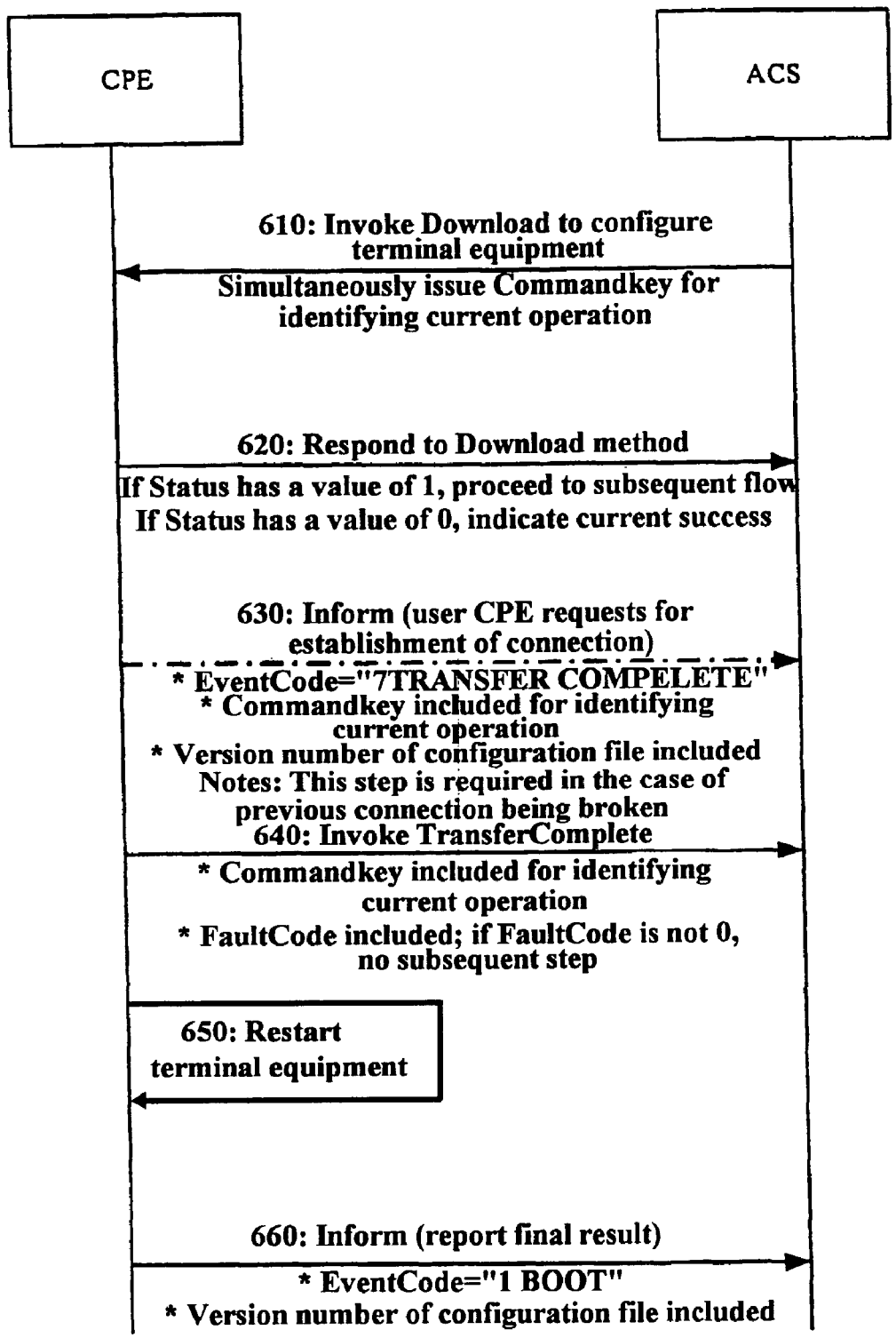
FIG. 6 is a flow chart for CPE configuration validation notification after a CPE restart according to the first embodiment of the present invention.

Referring to FIG. 6, another flow for CPE configuration validation notification will be described below, which is suitable for the case that a restart is required for configuration validation in the CPE.

Steps 610 through 640 are respectively identical to steps 510 through 540 in FIG. 5, and thus will not be described again here.

Subsequent to step 640, the CPE is restarted in step 650, and after the restart, the step 660 is executed. There may be a number of ways to determine whether or not a restart is required, wherein one way is to previously specify in the CPE that the CPE must restart after setting a new configuration, another way is to determine by the CPE whether the updated parameters are important preset ones, and if so, the CPE shall be restarted, otherwise not, and still another way is for the CS to specify in a previously issued command whether or not a restart is required.

In step 660, the configuration file is checked, and the parameters are updated in accordance with the modification flag in the configuration file checked with success. Upon completion of the update, the Inform method is invoked to inform the CS of the update result, wherein the parameters of the Inform include the version number of the configuration file and a parameter of EventCode with a value of "1 BOOT".

The following tables show data interfaces (functions) used in the above first embodiment.

| Interface Name | Download |
|---|---|
| Interface Comment | A CPE-provided function for being invoked by CS to set a terminal equipment to download a configuration file |

| Interface Name | DownloadResponse |
|---|---|
| Interface Comment | Download response function |

| Interface Name | Upload |
|---|---|
| Interface Comment | A CPE-provided function for being invoked by CS to set a terminal equipment to upload a configuration file |

| Interface Name | UploadResponse |
|---|---|
| Interface Comment | Upload response function |

| Interface Name | TransferComplete |
|---|---|
| Interface Comment | An interface for notification about the completion of transfer |

| Interface Name | Inform |
|---|---|
| Interface Comment | CPE message notification interface, where the version number of configuration file, InternetGatewayDevice.DeviceInfo.VendorConfigFile.{i}.Version, must be reported. |

The second embodiment of the present invention is based upon SNMP. The SNMP is a network management protocol early proposed as a provisional solution by the Internet Engineer Task Force (IETF), for management of IP networks and Ethernets. This protocol is characteristic of being simple, easy to implement and low cost, and thus gains broad supports. In recent years, the SNMP has developed rapidly and become a commonly used network management protocol, which in fact becomes a standard for network management.

Figure 7:
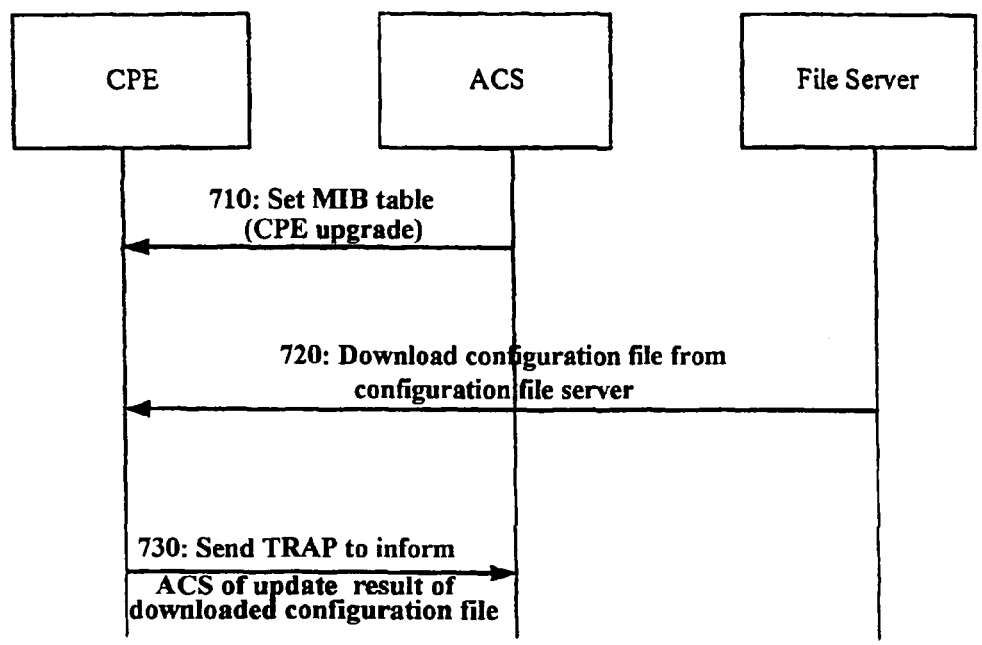
FIG. 7 is a flow chart for setting CPE parameter according to a second embodiment of the present invention.

Referring to FIG. 7, a flow for setting CPE parameters will be described below. When the CS needs to configure the parameters on the CPE, firstly the CS locally performs modification of a configuration file corresponding to the CPE, and stores the modified configuration file to the file server. Then in step 710, the CPE is set through a Management Information Base (MIB) table, notified of downloading the configuration file from the file server, and informed of relevant parameter necessary for the download of the configuration file, such as the address of the server, a protocol type for the download (FTP or HTTP, and in the case of FTP, an account number and a password are further needed to be provided), a path destined for the file, the name of the file, etc.

Next, the flow proceeds to step 720, wherein the CPE downloads the configuration file from the file server.

Next, the flow proceeds to step 730, wherein the CPE checks the downloaded configuration file, and upon success of the check, updates the parameters in accordance with the modification flag in the configuration file. The CPE, upon completion of the update, informs the CS of the update result through the TRAP (trap operation) message. The TRAP is an alarm message sent to the SNMP administrator indicative of the network status. The SNMP TRAP is one of major formats for SNMP messages which is used to initiatively report messages of alarms and events. An SNMP message can be divided into two parts, that is, an SNMP header and an SNMP body. The SNMP header is a standard part for the SNMP message, and shall be compliant to the definitions in the MIB TRAP specification for SNMP V1, V2c of the IETF, and the SNMP body is a TRAP parameter, which is a location parameter of TRAP and should be provided with a unique node identification in the MIB file.

Figure 8:
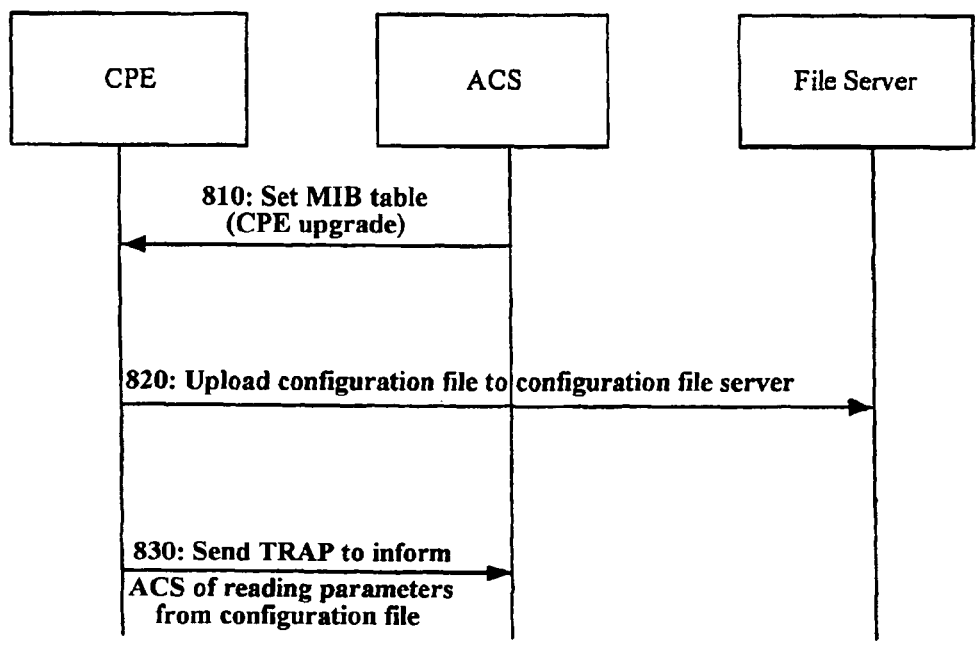
FIG. 8 is a flow chart for reading CPE parameter according to the second embodiment of the present invention.

Referring to FIG. 8, a flow for reading CPE parameters will be described below. When the CS needs to read the CPE parameters, the CPE is set through the MIB table, notified of uploading the current configuration file to the file server, and informed of relevant parameter necessary for the upload of the configuration file, such as the address of the server, a protocol type for the upload (FTP or HTTP, and in the case of FTA, an account number and a password are further needed to be provided), a path destined for the file, the name of the file, etc. in step 810.

Next, the flow proceeds to step 820, wherein the CPE uploads the current configuration file to the file server.

Next, the flow proceeds to step 830, wherein the CPE informs the CS of the upload result through a TRAP message upon completion of the upload.

Figure 9:
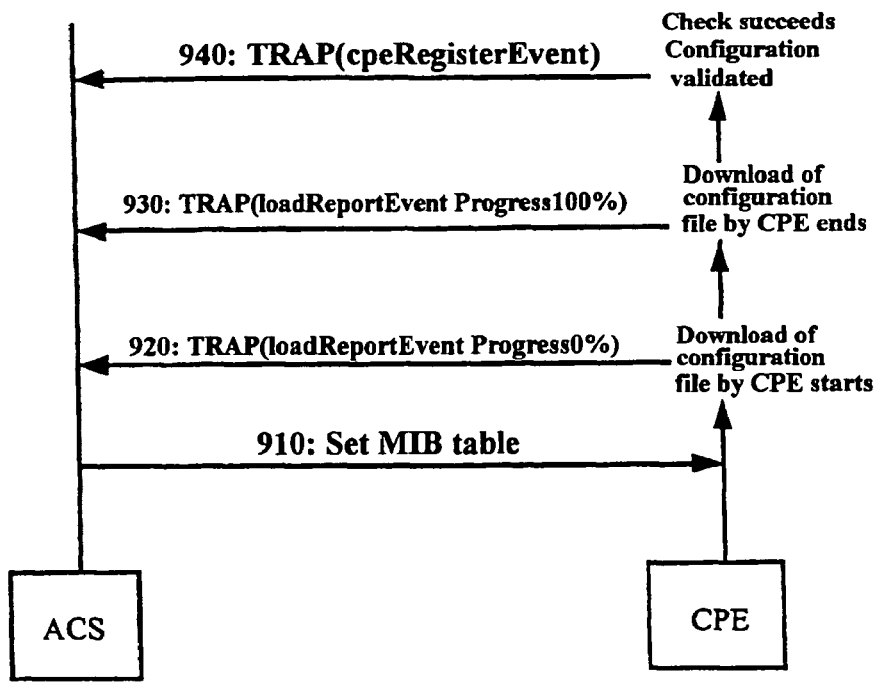
FIG. 9 is a flow chart for CPE configuration validation notification without a CPE restart according to the second embodiment of the present invention.

Referring to FIG. 9, a flow for CPE configuration validation notification will be described below, which is suitable for the case that no restart is required for configuration validation in the CPE.

In step 910, the CS sets the CPE through the MIB table, notifies the CPE of downloading the configuration file from the file server, and informs relevant parameters necessary for the download of the configuration file.

Then in step 920, the CPE, during the download from the file server, sends to the CS the loadReportEvent event TRAP, wherein the parameter cpeLoadProgress has a value of 0(%), which is indicative of the start of the download.

At the end of the download of the configuration file, the flow proceeds to step 930, wherein the CPE sends to the CS the loadReportEvent event TRAP with the parameter cpeLoadProgress having a value of 100(%), which is indicative of the completion of the download.

Thereafter, the flow proceeds to step 940, wherein the successfully downloaded configuration file is checked, and after the check with success, the parameters are updated in accordance with the modification flag in the configuration file. After the updated parameters are validated, the cpeRegisterEvent event TRAP including the version number of the configuration file is sent to the CS. The reason for upload of the version number is that it is used for determination as to whether a load of the configuration succeeds according to the embodiment, and if this version number is inconsistent with that expected by the administrator side, then it is indicative of failure of the load, otherwise it is indicative of success of the load.

Figure 10:
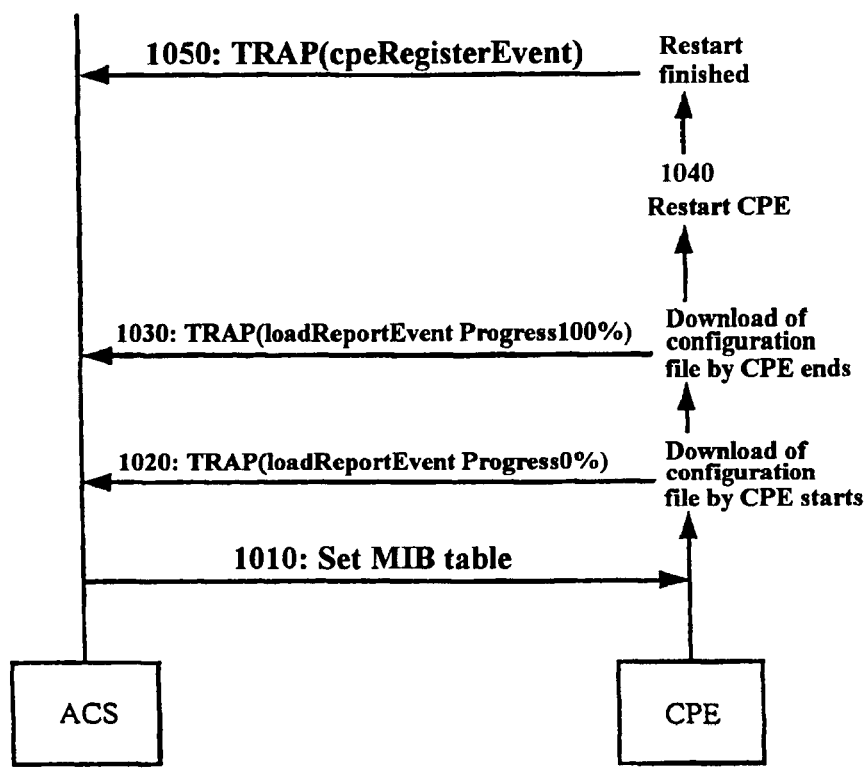
FIG. 10 is a flow chart for CPE configuration validation notification after a CPE restart according to the second embodiment of the present invention.

Referring to FIG. 10, another flow for CPE configuration validation notification will be described below, which is suitable for the case that a restart is required for configuration validation in the CPE.

Steps 1010 through 1030 are respectively identical to steps 910 through 930 in FIG. 9, and thus will not be described again here.

Subsequent to step 1030, the CPE is restarted in step 1040, and after the restart, step 1050 is executed.

Step 1050 is identical to step 940, and thus will not be described again here.

The interface protocol of the second embodiment is compliant to SNMP protocol (versions of SNMPV1, SNMPV2c). The following tables briefly illustrate SNMP data models used in the second embodiment.

| | |
|---|---|
| MIB Table Name | cpeUpgrade |
| MIB Comment | A MIB table for interaction between a terminal equipment and a CS. Through the setting of the table, the CS drives the terminal equipment to perform operations of upload and download of a configuration file, as defined by the CPE-GENERAL-MIB.mib from Technical Requirements on Integrated Management System of Access Equipments.<br>Related table leaves are described as following:<br>    a) cpeLoadServerIpAddr: an IP address of a file load server;<br>    b) cpeLoadProtocol: a file load protocol;<br>    c) cpeLoadContent: a type of file load contents;<br>    d) cpeLoadFileName: a load file name;<br>    e) cpeLoadUserName: a username for an access to a load server (FTP server) during a load;<br>    f) cpeLoadPassword: a password for an access to a load server (FTP server) during a load;<br>    g) cpeLoadMode: modes of terminal equipment load and validation;<br>    h) cpeLoadAdminStatus: a load operation;<br>    i) cpeLoadOperStatus: a load result;<br>    j) cpeLoadProgress: a load progress indication indicative of a completion percentage of download and upload, with its value ranging from 0 to 100. |

| MIB Table Name | Interface for notification events of upload/download result of a configuration file |
| --- | --- |
| MIB Comment | Used for a terminal equipment to inform a CS of upload or download result of a configuration file. A load progress and status is sent after a file upload/download starts; a load progress and status is sent after the file load/download ends; and a load progress and status is sent after a configuration is validated.<br>The following TRAP parameters are included:<br>   1) Event type;<br>   2) Load progress, corresponding to the leaf cpeLoadOperStatus in the cpeUpgrade table; and<br>   3) Load status, corresponding to the leaf cpeLoadProgress in the cpeUpgrade table;<br>as defined by the CPE-GENERAL-MIB.mib from Technical Requirements on Integrated Management System of Access Equipments. |

| MIB Table Name | Interface for management and registration events of a CPE terminal equipment |
| --- | --- |
| MIB Comment | An event TRAP which a terminal equipment, upon being powered on, needs to send to a CS, as defined by CPE-GENERAL-MIB.mib of version 2.1. Here, the leaf sysCfgFileVersion is additionally reported. |

| MIB Table Name | CPE system information table |
| --- | --- |
| MIB Comment | A MIB table descriptive of CPE basic information. Related leaves are as following:<br>  a) sysDescr: CPE description information including a system full name, a hardware type version, a software version, etc.;<br>  b) sysObjectID: information on a root node where the CPE is positioned;<br>  c) sysUptime: a value of time lapsed since the CPE system is powered on;<br>  d) sysContact: a contact for maintenance of the CPE, a contact mode;<br>  e) sysName: a CPE name;<br>  f) sysLocation: a physical location where the CPE is positioned;<br>  g) sysServices: a network function hierarchy of the CPE;<br>  h) sysORLastChange: an identifier of the time the CPE has its configuration changed;<br>  i) sysCfgFileVersion: a version number of the configuration file currently used by the CPE,<br>as defined by CPE-GENERAL-MIB.mib from Technical Requirements on Integrated Management System of Access equipments. Here, the sysCfgFileVersion is a newly added leaf. |

In the above first and second embodiments, the configuration file is generated through the configuration template. The configuration template contains configuration items common to the same type of CPEs, and incorporates personalized data of each CPE to generate a configuration file for the CPE. The personalized data of the CPE includes a service identifier, account number information, bandwidth, etc. The configuration file and the configuration template will be detailed below.

An example of the configuration template is shown as below.

```
<?xml version="1.0"?>
<InternetGatewayDeviceCofig xmlns="urn:dslforum-org:cpe-device-
config-1-0">
    <InternetGatewayDevice>
        <DeviceInfo ProvisioningCode="">
            <VendorConfigFile NumberOfEntries="1">
                <VendorConfigFileEntry EntryID="1" Version="9"/>
            </VendorConfigFile>
        </DeviceInfo>
    </InternetGatewayDevice>
    <AAA NumberOfEntries="4" MFlag="1">
        <aaaEntry EntryID="1"/>
        <aaaEntry EntryID="2" MFlag="1"/>
        <aaaEntry EntryID="3" AddFlag="1"/>
        <aaaEntry EntryID="4" DelFlag="1"/>
    </AAA>
</InternetGatewayDeviceCofig>
```

To attain the effect of batch configuration, the configuration file generated by the configuration template shall be compliant to the following configuration file specifications.

Firstly, the configuration file shall be compliant to XML 1.0 specification.

The <?xml version="1.0"?> in the above example indicates to the reader that the present file is compliant to XML 1.0 standard. The reason for the use of XML is that XML has a strong ability in expression, for instance, it can express a nested structure; XML can be adapted to requirements from various application contexts, and has a good basis for future upgrade of the system; and the XML is a standardized language, and hence is convenient for intercommunication between equipments from different manufacturers.

Secondly, each configuration file should has a unique name and may uniquely correspond to a CPE. Naturally, if the CPEs have no personalized attribute in some applications, then a plurality of CPE may correspond to a configuration file. According to an embodiment of the present invention, the naming rule is as following:

Terminal equipment OUI—Terminal equipment serial number.xml

The third is the storage path for the configuration file. It is recommended that the storage paths of the configuration files on the file server are distinguished respectively in accordance with the terminal equipment type, the terminal equipment OUI and the terminal equipment version.

For example, FTPSERVER/ADSL/00E0FC/V1
FTPSERVER/ADSL/00E0FC/V2
FTPSERVER/IAD/00E0FC/V1

Here, the FTPSERVER indicates an access of the file server to the home directory of the user.

Fourthly, the configuration file shall contain version information on the configuration file, for example, as following:

```
<InternetGatewayDevice>
    <DeviceInfo ProvisioningCode="">
        <VendorConfigFile NumberOfEntries="1">
            <VendorConfigFileEntry EntryID="1" Version="9"/>
        </VendorConfigFile>
    </DeviceInfo>
</InternetGatewayDevice>
```

It can be known from a comparison between the version information, whether the current configuration file of the CPE is the latest one, and whether a load of a new configuration file succeeds.

Fifthly, each configuration element in the configuration file may contain the following attributes:

| Attribute Name | Meaning of Attribute | Attribute Comment |
|---|---|---|
| MFlag | Modification flag of configuration item | The default value is 0. When it is required to inform the terminal equipment of a modified parameter, the attribute MFlag shall be set to "1" in the modified configuration item. |
| AddFlag | Addition flag of configuration item | The default value is 0. When it is required to inform the terminal equipment of an added parameter, the attribute AddFlag shall be set to "1" in the added configuration item. |
| DelFlag | Deletion flag of configuration item | The default value is 0. When it is required to inform the terminal equipment of a deleted parameter, the attribute DelFlag shall be set to "1" in the deleted configuration item. |

These attributes enable the CPE to merely observe those parameters in change, and thus, the efficiency for the CPE to process the configuration file can be improved. Since the CPE generally has a weak processing capability, its workload shall be reduced as much as possible.

Sixthly, a table object in the configuration file shall contain the attribute NumberOfInstances indicative of the number of line instances in the table. When a line instance contained in the table object is added or deleted, the attribute NumberofInstances of the table object shall be updated as the actual number of line instances after the change, the attribute MFlag of the table object is set to "1", the attribute AddFlag of the newly added line is set to "1", and the attribute DelFlag of the deleted line is set to "1".

According to another embodiment of the present invention, no additional file server is provided, and instead, a configuration file previously generated or modified can be stored in the configuration server. The customer premises equipment responds to the request message by downloading the previously generated configuration file from or uploading the local configuration file to the configuration server.

Although the present invention has been illustrated and described with reference to certain preferred embodiments thereof, it may be apparent to those skilled in the art that various changes in form and detail may be made therein without departing from the spirit and scope thereof.

What is claimed is:

1. A configuration management method for a customer premises equipment, comprising the steps of:

a configuration server sending to the customer premises equipment a request message for download or upload of a configuration file through an interface for transmission of configuration files, wherein the request message includes parameters necessary for the download or upload of the configuration file;

the customer premises equipment responding to the request message according to the parameters therein by downloading a previously-generated configuration file from or uploading a local configuration file to the configuration server or a file server through the interface; and upon completion of the download or upload, the customer premises equipment sending to the configuration server a response message including the result of the download or upload through the interface, wherein in the case of the download of the configuration file by the customer premises equipment, the step of the configuration server sending to the customer premises equipment the request message for download or upload of the configuration file further comprises the steps of:

before sending the request message, the configuration server generating the configuration file for the customer premises equipment with incorporation of personalized data of the customer premises equipment and according to a configuration template; and storing the configuration file in the configuration server or the file server, wherein the configuration template is used to store an attribute common to the same type of customer premises equipment, wherein the configuration file corresponds uniquely to the customer premises equipment, or corresponds to a plurality of customer premises equipment if the plurality of customer premises equipment have no personalized attribute, wherein in the case of the download of the configuration file by the customer premises equipment, the step of the customer premises equipment sending to the configuration server the response message further comprises the steps of after downloading the configuration file, the customer premises equipment checking the configuration file, and if the check succeeds, the customer premises equipment performing parameter configuration according to a content of the configuration file, and reporting a configuration result to the configuration server, otherwise setting, in the response message to the configuration server, information of the failure of the check on the configuration file, wherein the configuration file is compliant to a specification of eXtensible Markup Language, and comprises version information on the configuration file, wherein (1) the configuration file has a unique name and corresponds to a customer premises equipment; and/or (2) the configuration file is stored in a different directory on the file server according to the type thereof; and/or (3) each configuration element in the configuration file includes an operation type attribute indicative of the type of an operation performed on the configuration element; and/or (4) each table object in the configuration file has an attribute indicative of the number of line instances in the table, wherein the parameters necessary for the download or upload comprise an address of the file server, a protocol type for the download or upload, an account number and a password for the download or upload, a path destined for the configuration file, and a name of the configuration file, wherein in the step of the configuration server sending to the customer premises equipment the request message for download or upload of the configuration file, the configuration server sets an Management Information Base (MIB) table to inform the customer premises equipment of downloading the configuration file, wherein in the step of the customer premises equipment responding to the request message, upon start of the download or upload of the configuration file, the customer premises equipment informs the configuration server with a corresponding message, and wherein the step of the customer premises equipment sending to the configuration server the response message further comprises the steps of:

at the end of the download, the customer premises equipment informing the configuration server with a corresponding message; and if the download succeeds, then the customer premises equipment reporting, with a corresponding TRAP message, to the configuration server the final configuration information including the version number of the current configuration file.

2. The configuration management method for the customer premises equipment according to claim 1, wherein the operation type comprises modification, addition, or deletion.

3. The configuration management method for the customer premises equipment according to claim 1, wherein the method is implemented based upon a TR069 specification, wherein the configuration server invokes a corresponding function to inform the customer premises equipment of downloading the configuration file, and issues command information identifying the current operation, wherein the customer premises equipment responds to the configuration server, and wherein the step of the customer premises equipment sending to the configuration server the response message comprises the steps of:

at the end of the download, the customer premises equipment invoking a corresponding function to inform the configuration server, wherein the function includes the command information and an error code indicative of whether the download succeeds or not; and when the downloaded file is checked with success and validated, the customer premises equipment invoking a corresponding function to report to the configuration server the final configuration information including the command information and the version number of the current configuration file.

4. The configuration management method for the customer premises equipment according to claim 3, further comprising the step of in the case that the connection between the customer premises equipment and the configuration server is broken, the customer premises equipment invoking a corresponding function to reestablish the connection, wherein the function includes the command information and the version number of the current configuration file.

5. The configuration management method for the customer premises equipment according to claim 4, wherein in the case that the customer premises equipment needs a restart for validation of a new configuration, the customer premises equipment is restarted after the step of the customer premises equipment invoking the corresponding function to inform the configuration server.

6. The configuration management method for the customer premises equipment according to claim 1, wherein in the case that the customer premises equipment needs a restart for validation of a new configuration, the customer premises equipment is restarted after the step of the customer premises equipment informing the configuration server with the corresponding message.

7. A configuration management system for a customer premises equipment, comprising:

a configuration server; and
 a customer premises equipment,
 wherein the configuration server is adapted to send to the customer premises equipment a request message for download or upload of a configuration file through an interface for transmission of configuration files, wherein the request message includes parameters necessary for the download or upload of the configuration file;
 the customer premises equipment is adapted to respond to the request message according to the parameters therein by downloading a previously-generated configuration file from or uploading a local configuration file to the configuration server or a file server through the interface, and upon completion of the download or upload, to send to the configuration server a response message including the result of the download or upload through the interface,
 wherein in the case of the download of the configuration file by the customer premises equipment,
  before sending the request message, the configuration server generates the configuration file for the customer premises equipment with incorporation of personalized data of the customer premises equipment and according to a configuration template; and
  store the configuration file in the configuration server or the file server, wherein the configuration template is used to store an attribute common to the same type of customer premises equipment, and
 wherein the configuration file corresponds uniquely to the customer premises equipment, or corresponds to a plurality of customer premises equipment if the plurality of customer premises equipment have no personalized attribute,
 wherein after downloading the configuration file, the customer premises equipment checks the configuration file, and if the check succeeds, the customer premises equipment performs parameter configuration according to a content of the configuration file, and reports a configuration result to the configuration server, otherwise sets, in the response message to the configuration server, information of the failure of the check on the configuration file,
 wherein the configuration file is compliant to a specification of eXtensible Markup Language, and comprises version information on the configuration file,
 wherein (1) the configuration file has a unique name and corresponds to a customer premises equipment; and/or (2) the configuration file is stored in a different directory on the file server according to the type thereof; and/or (3) each configuration element in the configuration file includes an operation type attribute indicative of the type of an operation performed on the configuration element; and/or (4) each table object in the configuration file has an attribute indicative of the number of line instances in the table,
 wherein the parameters necessary for the download or upload comprise an address of the file server, a protocol type for the download or upload, an account number and a password for the download or upload, a path destined for the configuration file, and a name of the configuration file, wherein in the step of the configuration server sending to the customer premises equipment the request message for download or upload of the configuration file, the configuration server sets an Management Information Base (MIB) table to inform the customer premises equipment of downloading the configuration file, wherein in the step of the customer premises equipment responding to the request message, upon start of the download or upload of the configuration file, the customer premises equipment informs the configuration server with a corresponding message, and wherein the step of the customer premises equipment sending to the configuration server the response message further comprises the steps of:

at the end of the download, the customer premises equipment informing the configuration server with a corresponding message; and if the download succeeds, then the customer premises equipment reporting, with a corresponding TRAP message, to the configuration server the final configuration information including the version number of the current configuration file.

* * * * *